United States Patent
Chou (10) Patent No.: US 7,513,664 B2
(45) Date of Patent: Apr. 7, 2009

(54) OUTSIDE MIRROR APPARATUS INCLUDING LIGHTING DEVICE FOR VEHICLE

(75) Inventor: Shuuichi Chou, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 43 days.

(21) Appl. No.: 11/123,215

(22) Filed: May 6, 2005

(65) Prior Publication Data

US 2005/0254251 A1 Nov. 17, 2005

(30) Foreign Application Priority Data

| May 10, 2004 | (JP) | ............................ 2004-140084 |
| May 10, 2004 | (JP) | ............................ 2004-140085 |

(51) Int. Cl.
*B60Q 1/32* (2006.01)
*F21S 8/10* (2006.01)

(52) U.S. Cl. ...................... 362/494; 362/501; 362/517; 362/545; 362/800

(58) Field of Classification Search ................ 362/494, 362/501, 517, 545, 504, 362, 140, 142–144
See application file for complete search history.

(56) References Cited

U.S. PATENT DOCUMENTS

| 5,404,282 | A |   | 4/1995 | Klinke et al. |           |
| 5,490,049 | A | * | 2/1996 | Montalan et al. | ............ 362/240 |
| 5,497,306 | A | * | 3/1996 | Pastrick | ...................... 362/494 |
| 5,519,596 | A |   | 5/1996 | Woolverton |           |
| 6,099,153 | A | * | 8/2000 | Zimmermann et al. | ...... 362/494 |
| 6,250,784 | B1 | * | 6/2001 | Kayama | ..................... 362/494 |
| 6,561,685 | B2 | * | 5/2003 | Weber et al. | ................. 362/494 |
| 6,637,917 | B2 | * | 10/2003 | Schwanz et al. | ............ 362/487 |
| 6,695,465 | B2 | * | 2/2004 | Apfelbeck | ................... 362/494 |
| 6,769,798 | B2 | * | 8/2004 | Mishimagi | .................. 362/522 |
| 6,880,960 | B2 | * | 4/2005 | Mishimagi | .................. 362/494 |
| 6,926,432 | B2 | * | 8/2005 | Rodriguez Barros et al. | ..... 362/494 |
| 7,278,767 | B2 | * | 10/2007 | Takahashi et al. | ............ 362/494 |
| 2005/0047160 | A1 | * | 3/2005 | Evans | ......................... 362/494 |

FOREIGN PATENT DOCUMENTS

| JP | 60-161646 U | 10/1985 |
| JP | 07-106634 A | 4/1995 |
| JP | 08-316531 A | 11/1996 |
| JP | 2000-025519 A | 1/2000 |
| JP | 2000-260206 A | 9/2000 |
| JP | 2001-180377 A | 7/2001 |
| JP | 2002-079878 A | 3/2002 |
| JP | 2002-337606 A | 11/2002 |
| JP | 2002-362222 A | 12/2002 |
| JP | 2003-331635 A | 11/2003 |

* cited by examiner

*Primary Examiner*—Jong-Suk (James) Lee
*Assistant Examiner*—Leah S Lovell
(74) *Attorney, Agent, or Firm*—Foley & Lardner LLP (57) ABSTRACT

An outside mirror apparatus for a vehicle includes a mirror housing including an opening, a housing recess, and a cutout communicating with the housing recess; a mirror unit; and a lighting device including a lamp housing and a lamp lens, a light irradiating unit, and a light source. The housing recess and the cutout are provided in the mirror housing; the light irradiating unit is provided in the lighting device; the lighting device is housed in the housing recess; and the light irradiating unit is arranged in the cutout. An outer surface of the light irradiating unit is provided along an outer surface of the mirror housing.

4 Claims, 7 Drawing Sheets

OUTSIDE MIRROR APPARATUS INCLUDING LIGHTING DEVICE FOR VEHICLE

CROSS-REFERENCE TO RELATED APPLICATIONS

The present document incorporates by reference the entire contents of Japanese priority documents, 2004-140084 filed in Japan on May 10, 2004 and 2004-140085 filed in Japan on May 10, 2004.

BACKGROUND OF THE INVENTION

1) Field of the Invention

The present invention relates to an outside mirror apparatus including a lighting device for a vehicle.

2) Description of the Related Art

As an outside mirror apparatus for a vehicle, including a lighting device of this type, there is, for example, a vehicle outside mirror described in Japanese Patent Application Laid-Open No. 2002-337606 (hereinafter, "related technology").

The related technology is explained below. Parenthesized reference numerals correspond to components in the related technology, respectively. In the related technology, a base (81) of a lamp unit (8) is inserted from an opening (101) of a cover body (10) to be coupled onto a housing main body (11) by a clip (85). In addition, an irradiating unit (82) of the lamp unit (8) is engaged with the opening (101) of the cover body (10) by a coupling force of the clip (85). In the related technology, when a light emitting diode (LED) (9) of the lamp unit (8) is turned on to emit light, the light from the LED (9) is transmitted through the irradiating unit (82) to be irradiated on a predetermined light distribution zone. Consequently, the lamp unit (8) functions as a blinder, a foot lamp, and the like.

In the related technology, the lamp unit (8) is required to be housed and mounted in a fixed position and in a small and limited space. Moreover, light distribution of the lamp unit (8) is required to be satisfied. Therefore, in the related technology, the irradiating unit (82) of the lamp unit (8) projects from an outer surface of the cover body (10) or a recess (115) is provided in the housing main body (11) around the irradiating unit (82). As a result, the appearance of the outside mirror apparatus is deteriorated.

SUMMARY OF THE INVENTION

It is an object of the present invention to solve at least the above problems in the conventional technology.

An outside mirror apparatus for a vehicle according to one aspect of the present invention includes a mirror housing including an opening provided on a back side of the mirror housing, a housing recess provided to be recesses to an inner side of the mirror housing on a left side or a right side of the mirror housing, and a cutout communicating with the housing recess provided on the left side or the right side of the mirror hosing; a mirror unit that is mounted on the inner side of the mirror housing via a holding unit, the mirror unit being tiltably located in the opening; and a lighting device including a lamp housing and a lamp lens housed in the housing recess, a light irradiating unit provided in a projected shape in the lamp lens, the light irradiating unit being arranged in the cutout, and a first light source that is arranged in a lamp chamber partitioned by the lamp housing and the lamp lens, and irradiates light to a predetermined light distributing zone from the light irradiating unit. A wall of the housing recess is formed in a shape avoiding a tilting area of the mirror unit and an arrangement area of the holding unit. The lamp housing is formed in a shape modeled after the shape of the wall of the housing recess. An outer surface of the light irradiating unit is provided along an outer surface of the mirror housing.

The other objects, features, and advantages of the present invention are specifically set forth in or will become apparent from the following detailed description of the invention when read in conjunction with the accompanying drawings.

DETAILED DESCRIPTION

Exemplary embodiments of an outside mirror apparatus according to the present invention are explained in detail below with reference to the accompanying drawings. Note that the present invention is not limited by the present embodiments.

FIGS. 1 to 10 illustrate an outside mirror apparatus according to a first embodiment of the present invention. A structure of the outside mirror apparatus according to the first embodiment is explained below. In the figures, reference sign "F" denotes a front side of a car (a vehicle) C (a forward traveling direction side of the car C). Reference sign "B" denotes a back side of the car C. Reference sign "U" denotes an upside of the car C at the time when a driver views the front side of the car C. Reference sign "D" denotes a downside of the car C at the time when the driver views the front side of the car C. Reference sign "L" denotes a left side of the car C at the time when the driver views the front side of the car C. Reference sign "R" denotes a right side of the car C at the time when the driver views the front side of the car C. Note that, in this specification and patent claims, "the front side, the back side, the upside, the downside, the left side, and the right side" correspond to the reference signs "F, B, U, D, L, and R" in the figures, respectively. In addition, reference sign "I" denotes an inner side (a center side) with respect to the car C. Reference sign "O" denotes an outer side (a lateral side) with respect to the car C.

Figure 1:
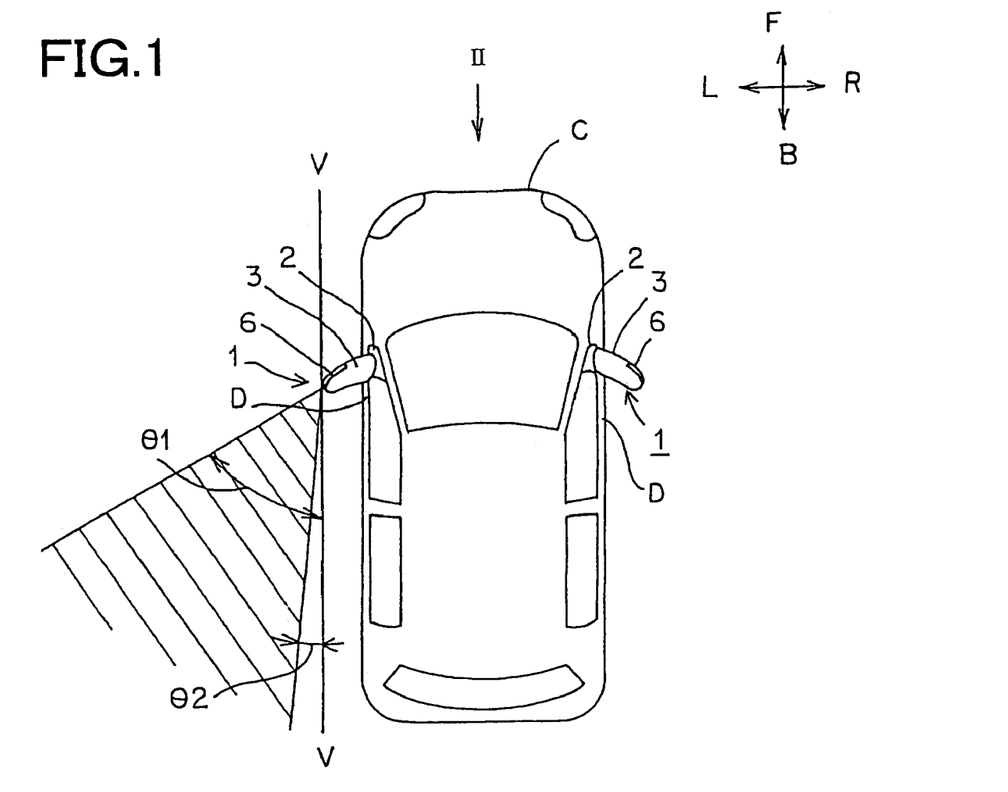
FIG. 1 is a plan view of a vehicle mounted with an outside mirror apparatus according to a first embodiment of the present invention.
Figure 2:
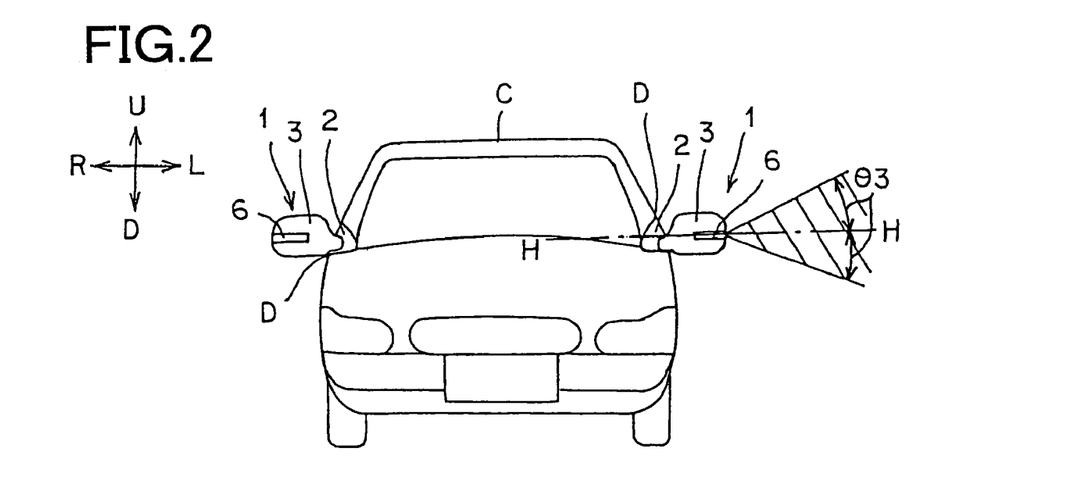
FIG. 2 is a front view of the vehicle viewed from a direction indicated by an arrow 11 in FIG. 1.
Figure 3:
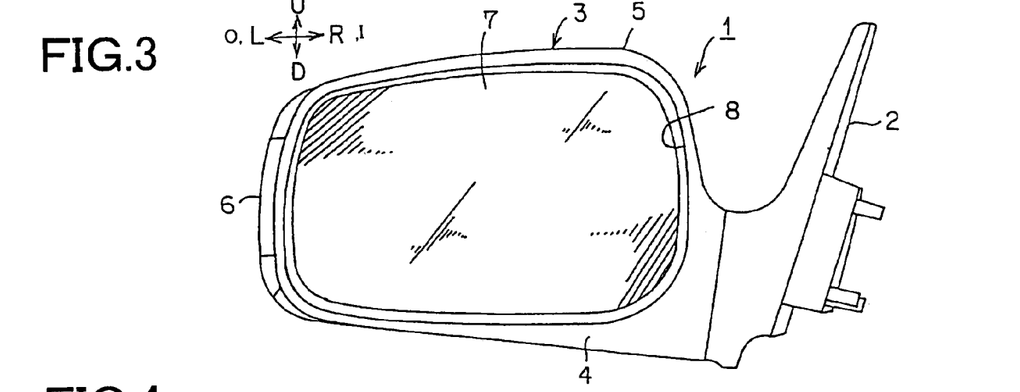
FIG. 3 is a front view of the outside mirror apparatus according to the first embodiment.
Figure 4:
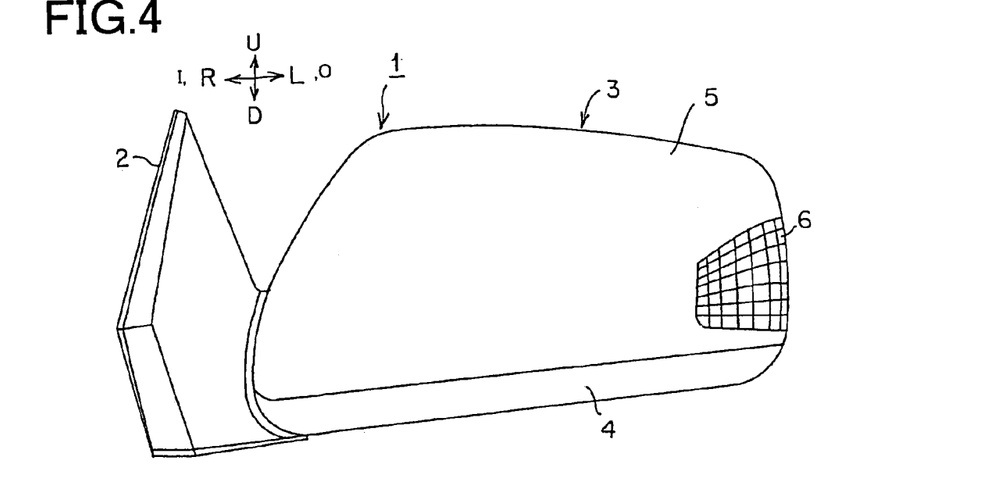
FIG. 4 is a rear view of the outside mirror apparatus according to the first embodiment.
Figure 5:
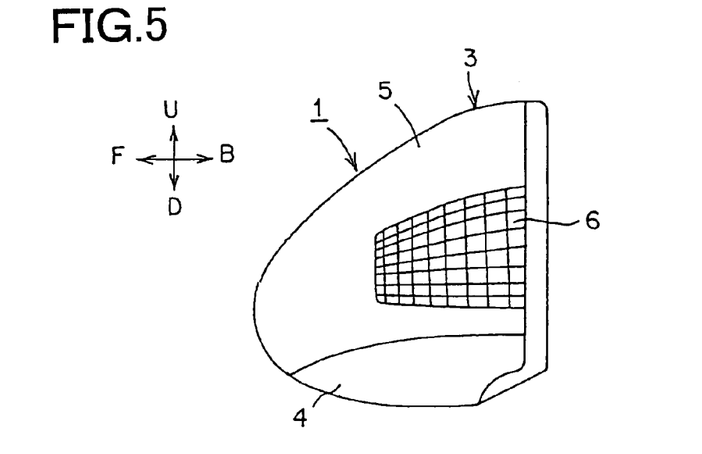
FIG. 5 is a left side view of the outside mirror apparatus according to the first embodiment.

In the figures, reference numeral 1 denotes the outside mirror apparatus according to the present embodiment (hereinafter, "door mirror 1"). As shown in FIGS. 1 and 2, the door mirrors 1 are mounted with side-turn signal lamps 6. The door mirrors 1 are mounted on left and right doors D of the car C, respectively. The door mirrors 1 include bases 2 fixed to the doors D and mirror assemblies 3 mounted on the bases 2.

The door mirror 1 mounted on the door D on the left side L of the car C is explained below with reference to FIGS. 3 to 6. Note that the door mirror 1 mounted on the door D on the right side R of the car C is symmetrical to the door mirror 1 on the left side L. The mirror assembly 3 of the door mirror 1 includes a mirror-housing main-body 4 and a garnish 5 forming a mirror housing, the side-turn signal lamp 6, and a mirror unit 7.

The mirror-housing main-body 4 is opened in an opening 8 on the back side B and is closed in a closed unit 9 on the front side F. The garnish 5 covers a unit on the front side F, a unit on the upside U, and a unit on the left side L of the closed unit 9 of the mirror-housing main-body 4. The garnish 5 is formed in a cover shape (a shape of a scull cap or a design cover). The garnish 5 is fixed to the mirror-housing main-body 4 by, for example, an engaging unit (not shown) including engaging claws and engaging holes. As a result, the mirror-housing main-body 4 and the garnish 5 are integrated to form the mirror housing.

Figure 6:
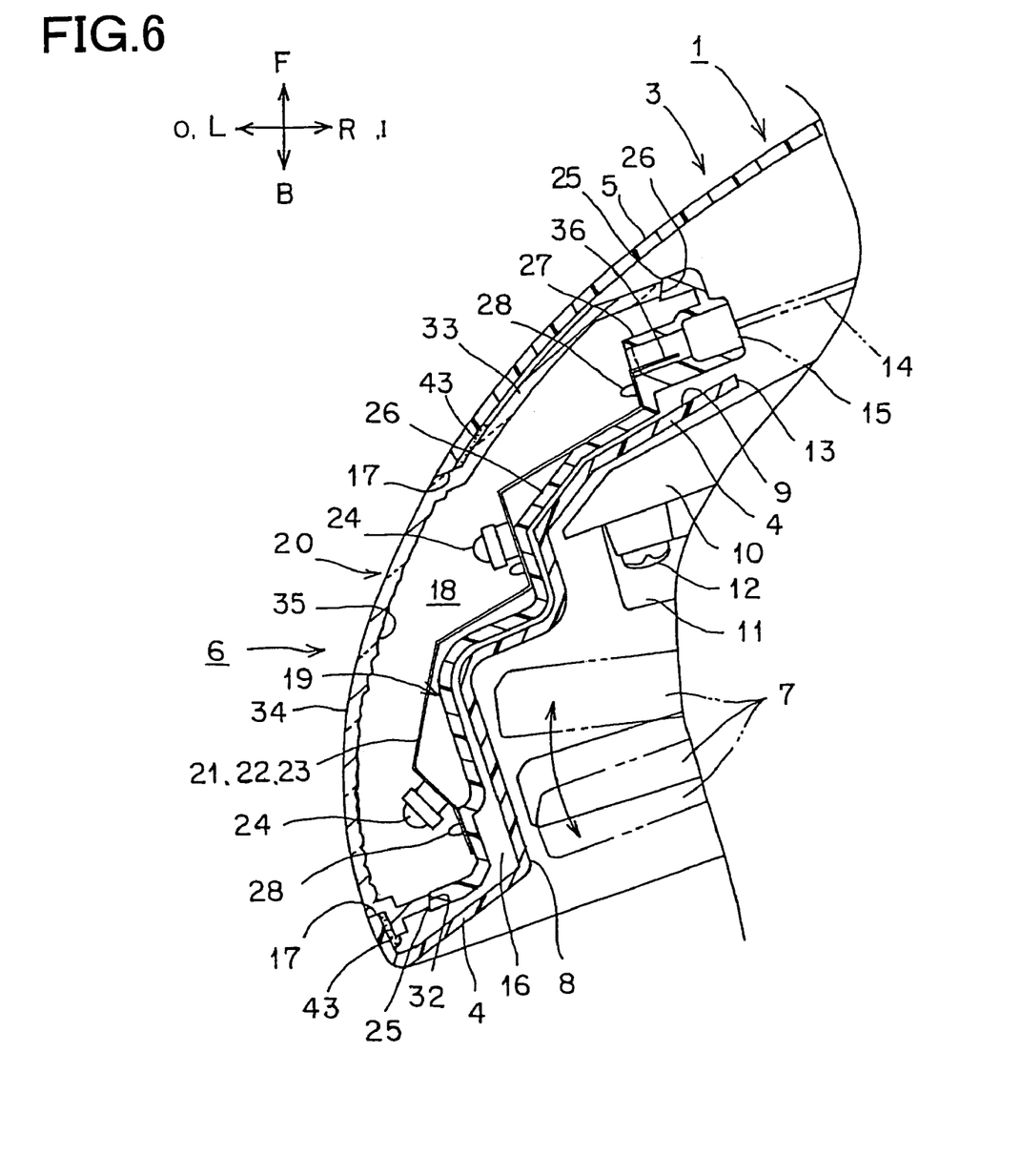
FIG. 6 is a partial horizontal cross-section of a main part of the outside mirror apparatus according to the first embodiment.

The mirror-housing main-body 4 is fixed to an attachment bracket 10, which is integrated with the base 2, by a screw (not shown) or the like. A power unit 11 is fixed to the attachment bracket 10 by a screw 12 or the like. The mirror unit 7 is attached to the power unit 11 to be tiltable to the left and right substantially around a vertical axis and tiltable up and down substantially around a horizontal axis. As a result, the mirror unit 7 is mounted on the inner side of the mirror-housing main-body 4 via the holding means (i.e., the attachment bracket 10, the power unit 11, and the like). In addition, the mirror unit 7 is located to be tiltable to the opening 8 of the mirror-housing main-body 4. Note that, FIG. 6 illustrates a state in which the mirror unit 7 indicated by an alternate long and two short dashes line tilts to the left and right with respect to the mirror unit 7 indicated by a solid line. A reflection surface for visually recognizing the rear of the car C is formed on the mirror unit 7.

A window unit 13 is provided substantially in the center of the closed unit 9 of the mirror-housing main-body 4. The window unit 13 is a unit for wiring a lamp harness 14 from an inner side (the back side B) to an outer side (the front side F) of the mirror-housing main-body 4. A lamp connector (a connector on a power supply side) 15 is connected to one end side of the lamp harness 14. The lamp connector 15 has female terminals (not shown). On the other hand, a power supply connector (not shown) on the side-turn signal lamp 6 side is connected to the other end side of the lamp harness 14. It is possible to supply electric power to the side-turn signal lamp 6 by connecting the power supply connector on the side-turn signal lamp 6 to a power supply connector (not shown) on the car C side. Note that the power supply connector on the car C side is connected to a power supply (a battery) on the car C side. Although not shown in the figure, a resistor, a diode, and the like for LED control are wired to the lamp harness 14.

In the mirror-housing main-body 4 and the garnish 5, a wraparound unit of a curved shape is formed in a unit on an outer side 0 with respect to the car C, that is, a unit on the left side L of the car C. Note that the unit is on the left side L in the case of the door mirror 1 on the left side L. The unit is on the right side R in the case of the door mirror 1 on the right side R. The side-turn signal lamp 6 is mounted on substantially the middle between the top and the bottom of the mirror-housing main-body 4 and the garnish 5. In the unit on the left side L of the mirror-housing main-body 4, a housing recess 16 for housing the side-turn signal lamp 6 is provided to be recessed to the inner side of the mirror-housing main-body 4. A cutout 17 communicating with the housing recess 16 is provided in the unit on the left side L of the garnish 5. A wall of the housing recess 16 forms a stepped shape from the opening 8 to the closed unit 9 to avoid a tilting area in the left to right direction of the mirror unit 7, an arrangement area of the attachment bracket 10 and an arrangement area of the power unit 13. In other words, a horizontal cross-section of the wall of the housing recess 16 assumes a stepped shape.

The side-turn signal lamp 6 serving as a lighting device mounted on the door mirror 1 is explained below. Note that the side-turn signal lamp 6 is mounted on the door mirror 1 on the left side L. A side-turn signal lamp mounted on the door mirror 1 on the right side R is symmetrical to the side-turn signal lamp 6 on the left side L.

Figure 7:
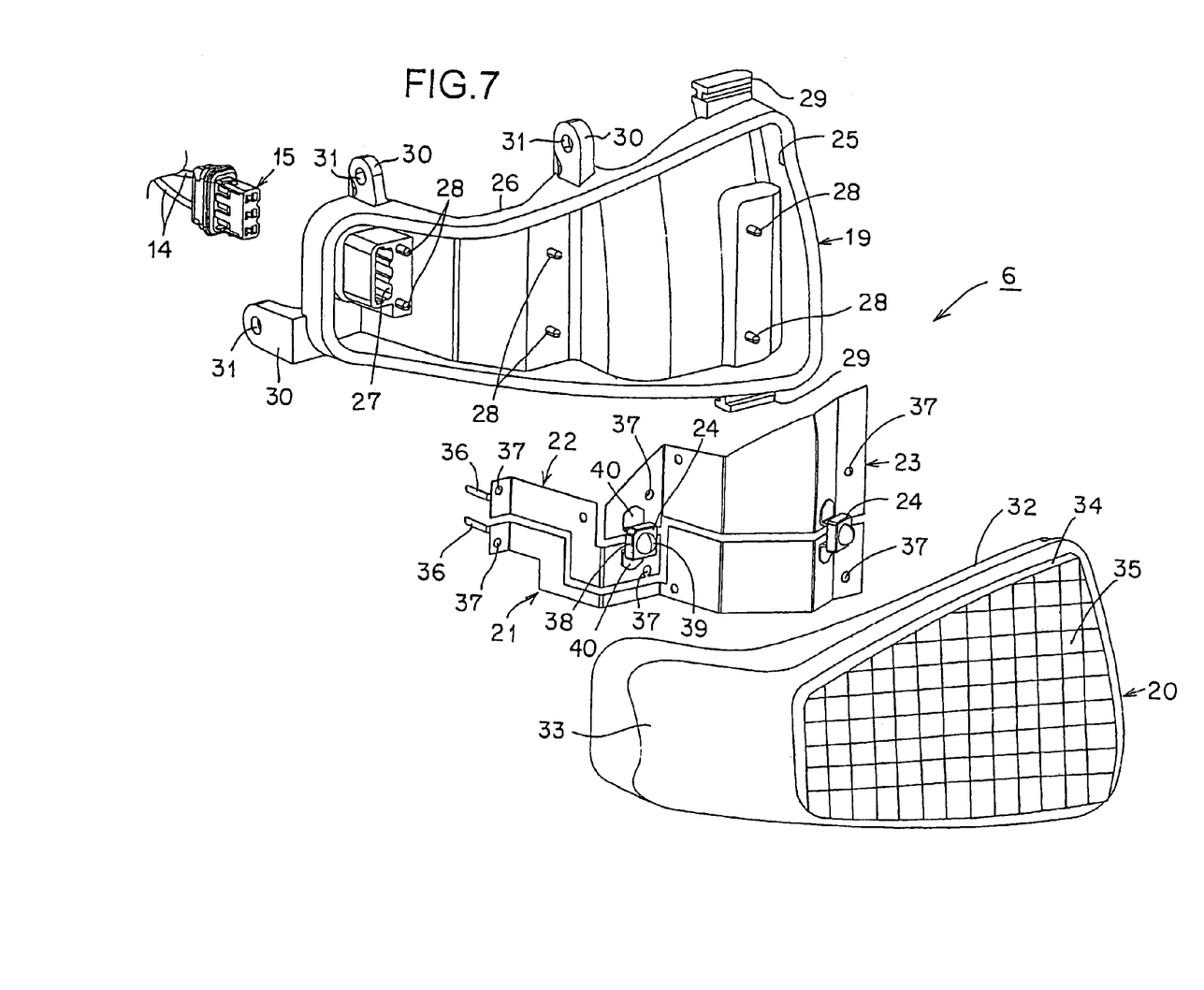
FIG. 7 is a disassembled perspective view of a lamp housing, a lamp lens, an assembly of a plate member and an LED, and a lamp connector.

As shown in FIGS. 6 and 7, the side-turn signal lamp 6 includes a lamp housing 19 and a lamp lens 20, which partition a lamp chamber 18, and plate members 21, 22, and 23 and two LEDs 24 serving as light sources, which are arranged in the lamp chamber 18. The side-turn signal lamp 6, that is, the lamp housing 19 and the lamp lens 20 are formed in a shape modeled after the wraparound of the mirror-housing main-body 4 and the garnish 5, that is, a wrapped-around shape.

The lamp housing 19 is opened in an opening 25 on the left side L and closed in a closed unit 26. A horizontal cross-section of a wall of the closed unit 26 assumes a stepped shape modeled after the wall of the housing recess 16. An inserting unit 27, in which the lamp connector 15 is inserted, is provided integrally at one end of the lamp housing 19. A plurality of pins 28 (six pins according to the present embodiment) is provided integrally on an inner surface (a surface opposed to the lamp lens 20) of the lamp housing 19. Moreover, plural, for example, two guide rails 29 formed in substantially an H shape and plural, for example, three fixed pieces 30 formed in substantially a tongue-shape are provided integrally in the lamp housing 19. In the three fixed pieces 30, small circular through-holes 31 are provided in a guide direction of the guide rails 29.

The lamp lens 20 is opened in an opening 32 opposed to the opening 25 of the lamp housing 19 and is closed in a closed unit 33. A projected unit 34 serving as a light irradiating unit is provided in a convex shape in the closed unit 33 in association with the cutout 17. Prisms 35 serving as a group of light-distribution control elements are provided on an inner surface (a surface opposed to the lamp housing 19) of the projected unit 34. A shape of an outer surface of the projected unit 34 assumes a shape matching with outer surfaces of the mirror-housing main-body 4 and the garnish 5 when the projected unit 34 is arranged in the cutout 17.

The plate members 21, 22, and 23 are divided into plural (three in this embodiment) pieces, that is, a first plate member 21, a second plate member 22, and a third plate member 23. The plate members 21, 22, and 23 are formed of an electrically conductive and thermally conductive member, for example, a steel sheet subjected to surface treatment for corrosion prevention and decoration. The surface treatment is, for example, nickel plating. Embossing may be applied to the surfaces of the plate members 21, 22, and 23.

Male terminals 36, which are connectable to the female terminals of the lamp connector 15, are formed integrally at one ends of the first plate member 21 and the second plate member 22 among the plates. Small circular through-holes 37 are provided in the plate members 21, 22, and 23 in association with the pins 28. A horizontal cross-section of the plate members 21, 22, and 23 assumes a stepped shape substantially along the wall of the closed unit 26 of the lamp housing 19. Moreover, the plate members 21, 22, and 23 have a size covering the lamp housing 19 in the lamp chamber 18 substantially entirely.

The LEDs 24 include main bodies 38 of a flat box shape, light-emitting units 39 of a dome shape provided integrally on upper surfaces of the main bodies 38, and pairs of lead legs 40 provided integrally from lower surfaces of the main bodies 38. Of the two LEDs, the pair of lead legs 40 of one LED 24 are fixed to the other end of the first plate member 21 and the other end of the third plate member 23 by, for example, laser welding. The pair of lead legs 40 of the other LED 24 are fixed to the middle of the second plate member 22 and the middle of the third plate member 23 by, for example, laser welding.

In this manner, the three plate members 21, 22, and 23 and the two LEDs 24 are formed as an assembly. A process for forming the three plate members 21, 22, and 23 and the two LEDs 24 as an assembly is explained below with reference to FIGS. 8 to 10.

Figure 8:
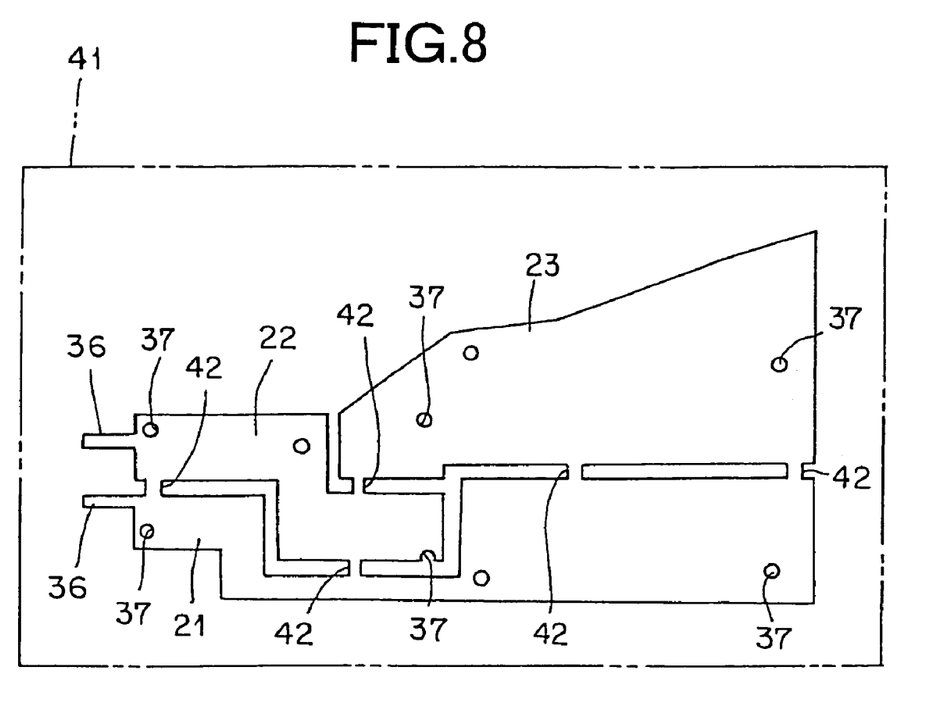
FIG. 8 is a diagram for explaining punching for the plate member of the lighting device.
Figure 9:
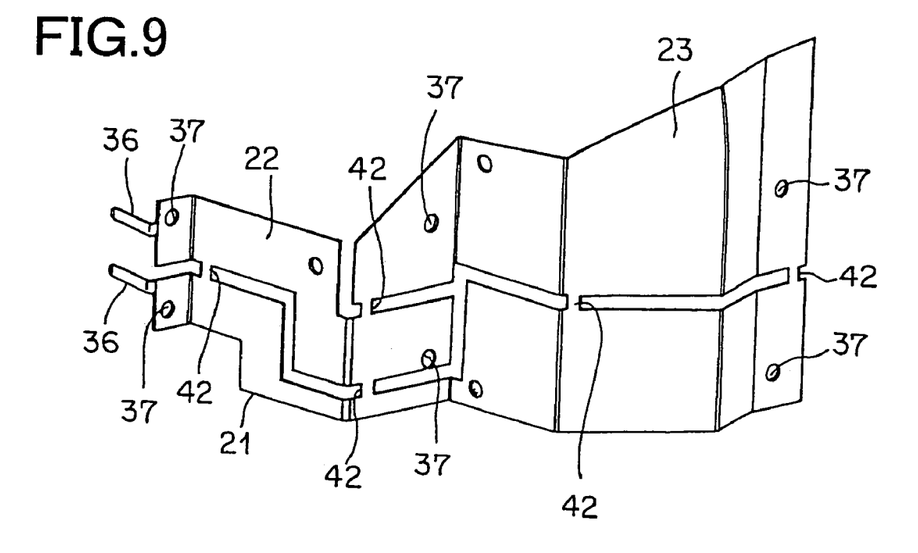
FIG. 9 is a diagram for explaining bending for the plate member of the lighting device.
Figure 10:
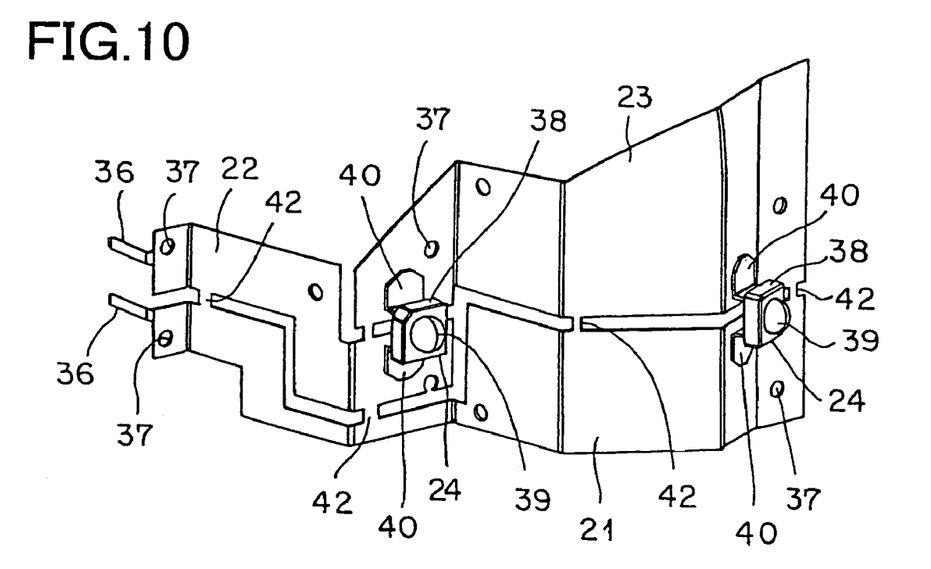
FIG. 10 is a diagram for explaining welding for the plate member and the LED of the lighting device.

First, a metal plate 41, which is formed of an electrically conductive and thermally conductive member, for example, a steel sheet subjected to surface treatment for corrosion prevention and decoration (e.g., nickel plating), is punched to be the three plate members 21, 22, and 23, the terminals 36, the through-holes 37, and tying units 42 by punching (see FIG. 8). Next, the punched three plate members 21, 22, and 23 and the terminal 36 are bent into a stepped shape by bending (see FIG. 9). Then, the lead legs 40 of one LED 24 are fixed to the other end of the bent first plate member 21 and the other end of the bent third plate member 23 by, for example, laser welding. In addition, the pair of lead legs 40 of the other LED 24 are fixed to the middle of the bent second plate member 22 and the middle of the bent third plate member 23 by, for example, laser welding (see FIG. 10). Then, the tying units 42 of the three plate members 21, 22, and 23, to which the two LEDs 24 are fixed, are cut and removed. Consequently, the three plate members 21, 22, and 23 and the two LEDs 24 are formed as an assembly (see FIG. 7).

The three plate members 21, 22, and 23, which are formed as the assembly with the two LEDs 24, are fixed to the inner surface of the lamp housing 19. In other words, the pins 28 of the lamp housing 19 are inserted into the through-holes 37 of the three plate members 21, 22, and 23 and thermally caulked, whereby the plate members 21, 22, and 23 are fixed to the lamp housing 19. At this point, the terminals 36 of the plate members 21 and 22 are arranged in the inserting unit 27 of the lamp housing 19. The inserting unit 27 of the lamp housing 19 and the male terminals 36 of the plate members 21 and 22 form a connector on a lamp side that is connectable to the lamp connector 15 serving as the connector on the power supply side.

The lamp housing 19, to which the three plate members 21, 22, and 23 formed as the assembly with the two LEDs 24 are fixed, and the lamp lens 20 are fixed. In other words, the entire peripheral edge of the opening 25 of the lamp housing 19 and the entire peripheral edge of the opening 32 of the lamp lens 20 are welded and fixed by, for example, ultrasonic welding. Consequently, the lamp chamber 18 is partitioned by the lamp housing 19 and the lamp lens 20 in a closed manner. With this closed partitioning, it is possible to prevent water and dusts from entering the lamp chamber 18.

The three plate members 21, 22, and 23 and the two LEDs 24 formed as an assembly are arranged in the partitioned lamp chamber 18 in a closed manner. At this point, the prisms 35 of the projected unit 34 of the lamp lens 20 are arranged along gaps among the three plate members 21, 22, and 23. Consequently, when the lamp chamber 18 is viewed from the outside through the projected unit 34 of the lamp lens 20, it is possible to show the lamp chamber 18 as if there are no gaps among the three plate members 21, 22, and 23 according to a photorefractive action of the prisms 35. Therefore, the appearance of the door mirror 1 is improved.

The side-turn signal lamp 6 formed as described above is mounted on the door mirror 1. The guide rails 29 of the side-turn signal lamp 6 (the lamp housing 19) are guided to and positioned in guide grooves (not shown), for example, V grooves provided in the door mirror 1 (the mirror-housing main-body 4). The three fixed pieces 30 of the side-turn signal lamp 6 (the lamp housing 19) are fixed to three boss units (not shown) provided in the door mirror 1 (the mirror-housing main-body 4) by screws (not shown). Note that it is also possible that one guide pin is provided instead of the three boss units and one of the three fixed pieces 30 is guided to and positioned in this guide pin without providing the guide rails 29.

In this manner, the side-turn signal lamp 6 is fixed to and housed in the housing recess 16 of the mirror-housing main-body 4. The projected unit 34 of the lamp lens 20 of the side-turn signal lamp 6 is arranged in the cutout 17 of the garnish 5. The lamp connector 15 for the connector on the power supply side is inserted in the inserting unit 27 of the connector on the lamp side. The male terminals 36 of the connector on the lamp side and the female terminals of the lamp connector 15 for the connector on the power supply side are connected. Note that a packing 43 is provided between the garnish 5 and the lamp lens 20.

The outside mirror apparatus 1 (the door mirror 1) according to the first embodiment has the structure described above. Actions of the outside mirror apparatus 1 are explained below.

First, it is possible to visually recognize the back side B of the car C with the reflection surface of the mirror unit 7 of the door mirror 1. Moreover, it is possible to tilt the mirror unit 7 in the up to down direction and the left to right directions with the power unit 11. Thus, it is possible to adjust a rear visual recognition area of the mirror unit 7 according to a physique and a posture of a driver. Note that, although not shown in the figure, if a heater is provided in the mirror unit 7, it is possible to prevent the mist on the reflection surface of the mirror unit 7.

The two LEDs 24 of the side-turn signal lamp 6 mounted on the door mirror 1 are turned on to emit light. Then, the light from the two LEDs 24 is transmitted through the prisms 35 for light-distribution control of the projected unit 34 of the lamp lens 20, controlled to be arranged in a predetermined area (a light distributing zone), and irradiated. An area of the light irradiated from the two LEDs 24 is a shaded area in FIGS. 1 and 2. This area is an area in which light arrangement of a turn signal lamp function is satisfied. Here, $\theta 1$ is 60 degrees and $\theta 2$ is 5 degrees with respect to an advance traveling axis V-V of the car C in FIG. 1. In addition, $\theta 3$ is 15 degrees with respect to a horizontal axis H-H of the car C in FIG. 2.

Note that, in FIGS. 1 and 2, the light arrangement area of the side-turn signal lamp 6 mounted on the door mirror 1 on the left side L is illustrated. However, the same light arrangement area is obtained for the side-turn signal lamp 6 mounted on the door mirror 1 on the right side R.

In the side-turn signal lamp 6 mounted on the door mirror 1, an LED emitting yellow or amber light or an LED emitting white light is used as the two LEDs 24. When the LED emitting white light is used, a lens colored in yellow or amber is used as the lamp lens 20. Therefore, the side-turn signal lamp 6 mounted on the door mirror 1 is a signal lamp that flashes and irradiates amber (or yellow) light on a predetermined light distributing zone to inform other drivers, pedestrians, and the like of the turn or the like of the car.

The outside mirror apparatus (the door mirror 1) according to the first embodiment has the actions described above. Advantages of the outside mirror apparatus 1 are explained below.

In the door mirror 1, the wall of the housing recess 16 of the mirror-housing main-body 4 is formed in a shape avoiding the tilting area of the mirror unit 7 and the arrangement area of the holding unit (the attachment bracket 10 and the power unit 1), that is, a stepped shape in a horizontal cross-section thereof. On the other hand, the lamp housing 19 of the turn signal lamp 6 mounted on the door mirror 1 is formed in a shape modeled after the shape of the wall of the housing recess 16, that is, a stepped shape in a horizontal cross-section thereof. This makes it possible to reduce a size and thickness of the entire turn signal lamp 6. Thus, it is possible to house and mount the lamp housing 19 of the turn signal lamp 6 in a fixed position (the wraparound unit on the left side L) of the door mirror 1 and in a limited space (the housing recess 16 of the mirror-housing main-body 4).

In the door mirror 1, the projected unit 34 of the lamp lens 20 of the turn signal lamp 6 is arranged in the cutout 17 of the mirror-housing main-body 4 and the garnish 5. The outer surface of the projected unit 34 is provided along the outer surfaces of the mirror-housing main-body 4 and the garnish 5. Moreover, it is possible to irradiate light from the LED 24 of the turn signal lamp 6 on a predetermined light distributing zone from the recess 34. As a result, the door mirror 1 can satisfy, light arrangement of the turn signal lamp 6. Moreover, the projected unit 34 of the lamp lens 20 never projects from the outer surfaces of the mirror-housing main-body 4 and the garnish 5. In addition, it is unnecessary to provide recesses in the mirror-housing main-body 4 and the garnish 5 around the turn signal lamp 6. Thus, the appearance of the door mirror 1 is improved.

In particular, in the door mirror 1, the horizontal cross-section of the wall of the housing recess 16 of the mirror-housing main-body 4 assumes a stepped shape. On the other hand, the horizontal cross-section of the lamp housing 19 of the side-turn signal lamp 6 assumes a stepped shape modeled after the wall of the housing recess 16. In addition, the three plate members 21, 22, and 23 of the side turn lamp 6 are formed in a stepped shape substantially along the horizontal cross-section of the lamp housing 19. As a result, in the side-turn signal lamp 6 mounted on the door mirror 1, the lamp housing 19 and the three plate members 21, 22, and 23 are set in abutment against each other face to face on a plane. Thus, it is possible to secure the three plate members 21, 22, and 23 to the lamp housing 19 accurately and surely. Consequently, the side-turn signal lamp 6 mounted on the door mirror 1 can perform accurate and sure light-distribution control for the two LEDs 24 that are formed as an assembly with the three plate members 21, 22, and 23 fixed to the lamp housing 19 accurately and surely.

In the door mirror 1, the horizontal cross-section of the wall of the housing recess 16 of the mirror-housing main-body 4 assumes a stepped shape. Thus, strength of the mirror-housing main-body 4 is increased. On the other hand, in the side-turn signal lamp 6 mounted on the door mirror 1, the horizontal cross-section of the lamp housing 19 assumes a stepped shape. Thus, strength of the side-turn signal lamp 6 is increased. Moreover, in the side-turn signal lamp 6 mounted on the door mirror 1, it is possible to adjust and control an irradiation direction of light from the two LEDs 24 by adjusting a bending angle of the three plate members 21, 22, and 23 forming the stepped shape. Thus, it is possible to irradiate light on a predetermined light distributing zone and satisfy a predetermined light arrangement standard.

In the side-turn signal lamp 6 mounted on the door mirror 1, the two LEDs 24 and the three plate members 21, 22, and 23 are formed as an assembly. The three plate members 21, 22, and 23 are formed of electrically conductive and thermally conductive members. In addition, the terminals 36 of the connector on the lamp side connectable to the terminals of the connector on the power supply side are integrally formed with the two plate members 21 and 22. Therefore, in the side-turn signal lamp 6 mounted on the door mirror 1, the two plate members 21 and 22 of the three plate members 21, 22, and 23 formed as an assembly with the two LEDs 24 have a connector function for connecting with the lamp connector 15 of the connector on the power supply side.

As a result, in the side-turn signal lamp 6 mounted on the door mirror 1, the three plate members 21, 22, and 23 formed as an assembly with the two LEDs 24 have a circuit function for supplying electric power to the two LEDs 24, a heat radiation function for conducting heat generated in the two LEDs 24 via the lead legs 40 and radiating the heat in the lamp chamber 18 and the other units in other places, and a connector function for connecting with the lamp connector 15 of the connector on the power supply side. Thus, it is possible to reduce the number of components and the number of assembly steps and to reduce manufacturing cost.

The side-turn signal lamp 6 mounted on the door mirror 1 has the three components, namely, the lamp housing 19, the lamp lens 20, and the assembly of three plate members 21, 22, and 23 and the two LEDs 24. Thus, it is possible to reduce the number of components and the number of assembly steps. Moreover, since management for components is simplified, it is possible to further reduce manufacturing cost.

In the side-turn signal lamp 6 mounted on the door mirror 1, the plate members 21, 22, and 23 are formed of a steel sheet subjected to surface treatment for corrosion prevention and decoration (e.g., nickel plating) and cover substantially the entire inner surface of the lamp housing 19 in the lamp chamber 18. As a result, when the lamp chamber 18 is viewed from the outside through the projected unit 34 of the lamp lens 20, the outside mirror apparatus (the side-turn signal lamp 6) according to the first embodiment looks glittering at high brightness and has feelings of crystal, metal, and the like because the plate members 21, 22, and 23 are subjected to the nickel plating. Therefore, the appearance of the door mirror 1 is improved.

In the side-turn signal lamp 6 mounted on the door mirror 1, the plate members 21, 22, and 23 are divided into three pieces. On the other hand, the prisms 35 of the lamp lens 20 are arranged along the gaps among the three plate members 21, 22, and 23. As a result, in the side-turn signal lamp 6 mounted on the door mirror 1, when the lamp chamber 18 is viewed from the outside through the projected unit 34 of the lamp lens 20, it is possible to show the lamp chamber 18 as if there are no gaps among the three plate members 21, 22, and 23 according to a photorefractive action of the prisms 35. Therefore, the appearance of the door mirror 1 is improved.

Figure 11:
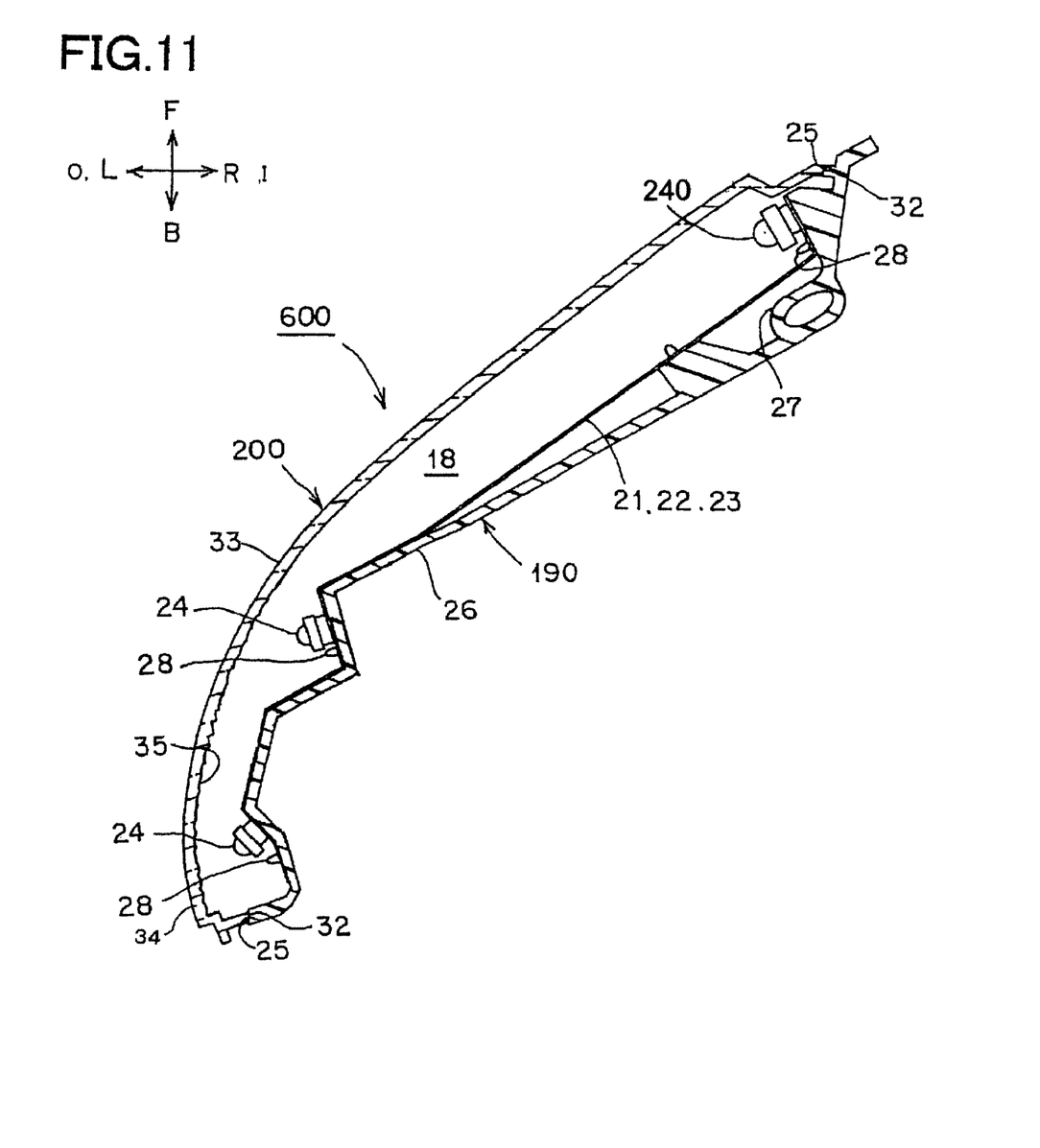
FIG. 11 is a horizontal cross-section of a lighting device in an outside mirror apparatus according a second embodiment of the present invention.

FIG. 11 is a horizontal cross-section of a lighting device in an outside mirror apparatus according a second embodiment of the present invention. In the figure, reference numerals same as those in FIGS. 1 to 10 denote the identical components.

In a side-turn signal lamp 600 mounted on the outside mirror apparatus according to the second embodiment, one LED for decoration (for dummy) 240 is added to the two LEDs 24 according to the first embodiment. A horizontal cross-section of the side-turn signal lamp 600, that is, a horizontal cross-section of a lamp housing 190 and a lamp lens 200 is longer in the horizontal direction (the left to right direction) than that of the side-turn signal lamp 6 according to the first embodiment. Note that a horizontal cross-section of the lamp housing 190 assumes a stepped shape modeled after a horizontal cross-section of a wall of a housing unit as according to the first embodiment. The two LEDs 24 according to the first embodiment are arranged on one end side (the left side L) of the side-turn signal lamp 600. On the other hand, the LED for decoration 240 is arranged on the other end side of the side-turn signal lamp 600. As described according to the first embodiment, the two LEDs 24 according to the first embodiment contribute to light arrangement of a turn signal lamp. However, the LED for decoration 240 simply gleams and does not contribute to light arrangement of a turn signal lamp.

In the side-turn signal lamp 600 mounted on the outside mirror apparatus according to the second embodiment, the two LEDs 24 according to the first embodiment are arranged on one end side of the side-turn signal lamp 600. Thus, it is possible to attain substantially the same actions and advantages as the side-turn signal lamp 6 according to the first embodiment. In particular, in the side-turn signal lamp 600, since the LED for decoration 240 is arranged on the other end side, even if a horizontal cross-section of the side-turn signal lamp 600 is longer than that of the side-turn signal lamp 6 according to the first embodiment, the long lamp lens 200 glimmers over the entire surface thereof. Thus, the appearance of the outside mirror apparatus is not deteriorated. In other words, in the side-turn signal lamp 600, since a light-emitting surface of the long lamp lens 200 is obtained, a light emission design different from the light emission design of the side-turn signal lamp 6 according to the first embodiment is obtained.

Note that, according to the first and the second embodiments, the side-turn signal lamps 6 and 600 are explained as a lighting device mounted on the door mirror 1. However, it is also possible to apply the present invention to lighting devices other than the side-turn signal lamps 6 and 600, for example, a lighting device for a small lamp like a side marker lamp and a lighting device for an image pickup apparatus.

According to the first and the second embodiments, two or three LEDs 24 and 240 are connected in series to the three plate members 21, 22, and 23. However, in the present invention, LEDs may be connected in parallel to plate members.

According to the first and the second embodiments, the three plate members 21, 22, and 23 and the two or three LEDs 24 and 240 formed as an assembly are explained. However, in the present invention, the number of plate members, the number of LEDs, and the like are not specifically limited.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An outside mirror apparatus for a vehicle, comprising:
    a mirror housing including:
        an opening provided on a back side of the mirror housing;
        a housing recess in an inner side of the mirror housing on a left side or a right side of the mirror housing; and
        a cutout communicating with the housing recess provided on the left side or the right side of the mirror housing;
    a mirror unit that is mounted on the inner side of the mirror housing via a holding unit, the mirror unit being tiltably located in the opening; and
    a lighting device including:
        a lamp housing and a lamp lens housed in the housing recess;
        a light irradiating unit provided in a projected shape in the lamp lens, the light irradiating unit being arranged in the cutout; and
        a first light source that is arranged in a lamp chamber partitioned by the lamp housing and the lamp lens, and irradiates light to a predetermined light distributing zone from the light irradiating unit;
        a second light source arranged in the lamp chamber for lighting the entire lamp lens in conjunction with the first light source, the lamp lens having an elongated horizontal cross-section, wherein
    a wall of the housing recess is formed in a shape avoiding a tilting area of the mirror unit and an arrangement area of the holding unit,
    the lamp housing is formed in a shape modeled after the shape of the wall of the housing recess over substantially the entire length from an opening portion to a closing portion of the lamp housing, wherein horizontal cross-sections of the wall of the housing recess and the lamp housing form a stepped shape in such a manner as to secure the tilting movement of the mirror unit which moves only within the mirror housing and
    an outer surface of the light irradiating unit is provided along an outer surface of the mirror housing;
    the first light source and the second light source are light emitting diodes,
    the light emitting diodes are formed as an assembly with a plurality of stepped shape plate members which are made of an electrically conductive member, and
    the light emitting diodes and the plurality of plate members are arranged in the lamp chamber in such a manner that each of the light emitting diodes is placed connecting two of the plate members, and wherein
    the light irradiating unit includes a group of light-distribution control elements that controls light from the light emitting diodes to irradiate the light on the predetermined light distributing zone, and
    the group of light-distribution control elements is arranged along gaps among the plurality of sheets of the plate member.

2. The outside mirror apparatus according to claim 1, wherein each of the plate members is formed in a shape modeled after the shape of the lamp housing, and is fixed to the lamp housing.

3. The outside mirror apparatus according to claim 1, wherein each of the plate members is integrally formed with terminals of a connector on a lamp side that are connectable to terminals of a connector on a power supply side.

4. The outside mirror apparatus according to claim 1, wherein each of the plate members is made of a steel sheet to which a surface treatment for corrosion prevention and decoration is performed, and covers substantially an entire surface of the lamp housing in the lamp chamber.

* * * * *